April 18, 1950 R. G. BAILEY 2,504,787
DISTRIBUTING DEVICE
Filed Aug. 1, 1947
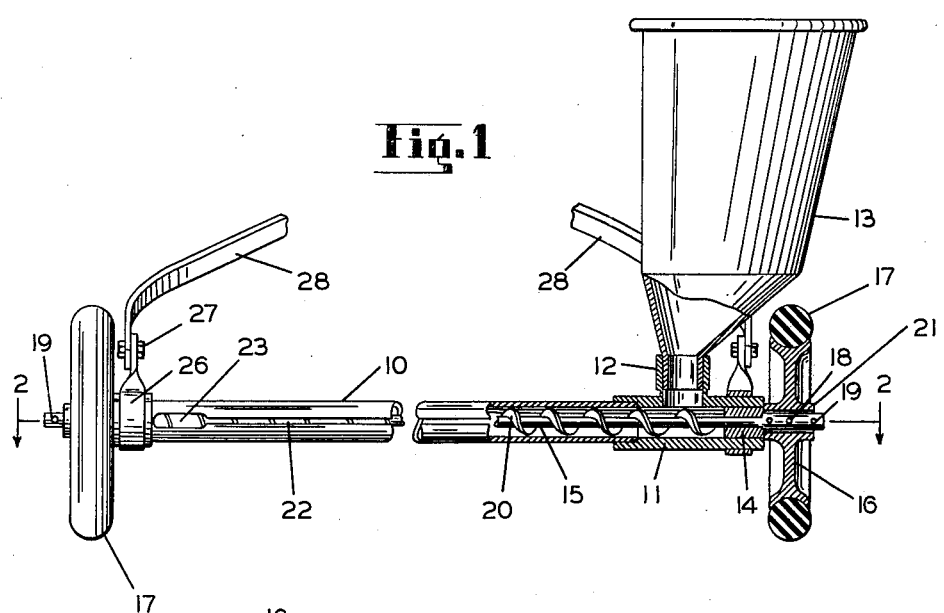
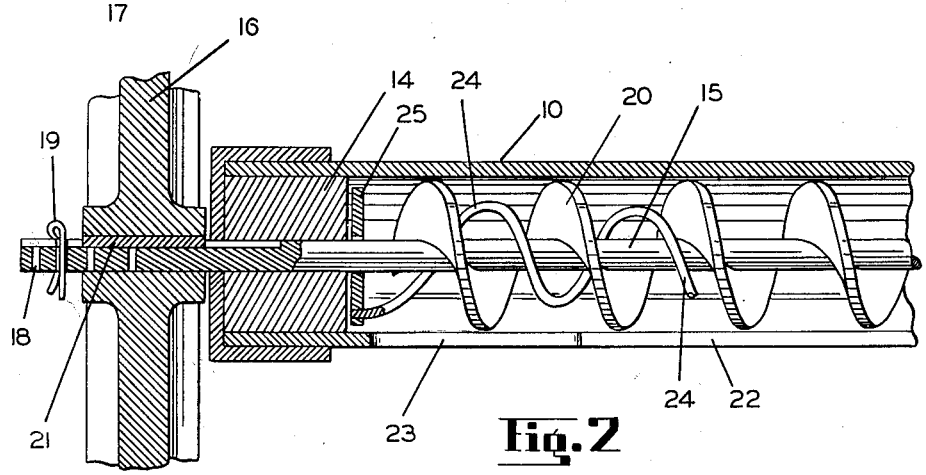
*INVENTOR.*
ROBERT G. BAILEY
BY
Christian R. Nielsen
*ATTORNEY.*

Patented Apr. 18, 1950

2,504,787

UNITED STATES PATENT OFFICE 2,504,787

DISTRIBUTING DEVICE

Robert G. Bailey, Kenosha, Wis.

Application August 1, 1947, Serial No. 765,383

3 Claims. (Cl. 275—2)

My invention relates to distributing devices employed for spreading or distributing seed, lime, sand, fertilizer or the like over the surface or ground.

It has for its object the improvement in the arrangement of the features and the incorporation of additional improvements in devices as described in my pending application, Serial Number 676,695, dated June 14, 1946.

In the distribution of fertilizer, lime or the like over soil or lawn, it is imperative that the product be distributed evenly over a pre-determined path and avoid the possibility of lumps or congested portions of material being deposited onto the lawn, thereby providing too much material at certain spots, which might prove detrimental.

The device illustrated, specified and claimed herein provides a means of insuring an even distribution of whatever material or product is being distributed, and provides a means of breaking up any particles that may accumulate at the further end of the enclosure.

Other and further objects of my invention will be further brought out and will be more fully described, reference being had to the accompanying drawing in which Figure 1 is a fragmentary cross-sectional view of the back of the device, and Figure 2 is a fragmentary cross-sectional view of the device shown in Figure 1, taken at the line 2—2 therein.

Similar characters of reference indicate corresponding parts throughout the several views, and referring now to the same, I show a tubular enclosure identified by the character 10 which is provided at one of its ends with a T arrangement 11 which opens into a ferrule 12 extending upward and acts as a receiving unit for the bottom of a hopper member shown as 13. The tubular enclosure 10 is shown provided with inserts 14 which are preferably of hard wood or the like and which act as bearings for a shaft or axle shown as 15 which extends longitudinally through the entire tubular enclosure 10 and the horizontal portion of the T member 11. This shaft 15 supports a pair of wheels 16 which may be of any type and are shown as provided with rubber tires 17 and the axle or shaft 15 is provided with a plurality of apertures shown as 18 which extend through the shaft 15 and are adapted for receiving a cotter pin or the like shown as 19.

There is a spiral screw structure 20 attached to the shaft 15 and made an integral part thereof, and the object of the apertures 18 in the shaft 15 is to permit the movement of the shaft 15 in either direction which will directly affect the amount of the product disposed within the hopper 13 being fed by means of the spiral screw member 20 when the wheels 16 are rotated. Obviously, the wheels 16 are to be keyed to the ends of the axle 15 by keys shown as 21 so that the revolving of the wheels 16 will also have a tendency to revolve the shaft 15 and the location of the spiral screw arrangement 20 under the opening of the hopper 13 will determine how much of the product is being forced to the farther end of the tubular enclosure 10.

The tubular enclosure 10 is provided with an elongated slot shown as 22 extending its entire length and has at its farther end away from the hopper 13 an elongated aperture shown as 23. The object of the aperture 23 being to permit the product which may have accumulated in lumps or congested portions to be conveyed by means of the spiral screw 20 to the farther end of the tubular enclosure 10 to be dispensed; the enlargement offered by the elongated aperture 23 over the diameter of the slot 22 permits these lumps to be dispensed.

In Figure 2 I illustrate a breaking member 24 which is in the form of a wire of spiral contour attached to the face of a washer member 25. The spiral portions of the wire 24 are disposed centrally between the spiral sections of the screw 20 so that when the congested part or lumps of the products being dispensed find their way toward the farther end of the tubular enclosure 10 the spiral wire or breaking member 24 will break up these lumps and cause them to be disintegrated so that they will be broken into smaller portions that may be dispensed through the elongated aperture 23.

I also show a pair of band members 26 disposed around the outer peripheral surface of the tubular member 10 and provided with a screw shown as 27 which is employed to support two handle portions 28 so that the entire device may be manually pushed or caused to be propelled over the surface, or the attaching band members may be employed for supporting link members which attach the device to a lawn mower or the like, whether it be manually operated or mechanically operated, it making it possible to distribute the product immediately behind the mower as the grass is being cut.

From the description it is manifest to anyone familiar with the art that the device is very simple in construction and has but very few component parts and the arrangement of the parts is such that it would permit positive operation and function for the purpose for which it is intended.

While I have herein shown a particular construction of the parts, I do not wish to limit myself to the specific construction shown, for in the construction of the device it is possible to make many changes which would not in any way affect the operativeness of the device and would keep it within the scope of the appended claims.

Having thus described my invention, what I claim and desire to secure by Letters Patent in the United States is:

1. A device of the character described comprising a hopper, a tubular member extending outward from the bottom of said hopper, a horizontal tube, said tube engaging the lower end of said hopper outlet, bearings inserted into the open ends of said tube, a shaft supported within said bearings, said shaft longitudinal and centrally disposed within said tube, said tube provided with a longitudinal slot terminating into an elongated aperture through the wall of said tube, a spiral member attached to said shaft, a pair of wheels mounted to said shaft outside of said tube, said wheels arranged to rotate said shaft and spiral member, and a spirally disposed breaker member supported at one end by a washer member rotatably supported by said shaft at the point farthest from said hopper, said breaker having its depending end inwardly disposed and central of the spiral portion of said spiral member, and means attached to the outer ends of said tubular member for attaching said device to a lawn mower or handle so that it may be propelled over a surface.

2. A device of the character described comprising a longitudinal tubular enclosure open at both ends, bearings inserted into the open ends, an axle shaft longitudinally disposed within said tube, said shaft slidably journaled within said bearings, a hopper, said hopper provided with an outlet at its lower end, said tubular member provided with an inlet through its upper wall near one of its ends, the inlet to said tube arranged for receiving the outlet of said hopper, a spiral member attached to and projecting outward radially from said axle shaft, said spiral member of a length shorter than the space between said bearings, said spiral member extending outward to a point near the inner face of said tube, a pair of wheels mounted to the ends of said axle, said wheels keyed to said axle, both of said wheels slidably attached to said axle, a plurality of apertures provided with pins extending through said axle to permit slidable longitudinal adjustment and support of said axle in said bearings, a longitudinal slot extending through the wall of said tube, an elongated aperture of a diameter greater than that of said slot at the extreme end of said slot, and a spirally disposed breaker member rotatably supported by said shaft at a point near the inward end of one of said bearings in said tube adjacent said elongated apertures, said breaker member arranged for spiral engagement between the spiral portions of said spiral member, attaching means on the outer surface of said tubular member, said attaching means disposed for engagement with a handle or link members for attachment to a mower or the like.

3. A dispensing device of the character described comprising an elongated tubular enclosure open at both ends, said enclosure provided with a longitudinal slot through its wall, said slot terminating into an elongated aperture of a diameter greater than said slot at one of its ends, bearings mounted into the open ends of said tube, an inlet port through the wall of said tube at the opposite end from said elongated slot, a hopper member, said hopper member open at its upper end and provided with a tubular outlet at its lower end, the outlet of said hopper member disposed for engagement with the inlet port in said tubular member, an axle shaft longitudinally disposed within said tube and slidably journaled in said bearings, a spiral member attached to and forming an integral part of said axle shaft, said spiral member extending radially outward from said shaft to a point near the wall of said tubular member, said spiral member of a length shorter than the space between the bearings within said tube, a pair of wheels, said wheels slidably mounted to the ends of said axle, said wheels keyed to said axle, a plurality of apertures disposed near the end of said axle, pins arranged for engagement with said axle, said pins and apertures arranged for slidably moving said axle within said tubular casing between said bearings, a spirally disposed breaker member attached to a member mounted on said shaft at a point farthest from said hopper, said breaker member arranged to a contour to extend between the spiral portion of said spiral member, and means attached to the outer face of said tubular member for attaching said device to a handle or lawn mower for propelling the entire device over a surface.

ROBERT G. BAILEY.

REFERENCES CITED

The following references are of record in the file of this patent:

UNITED STATES PATENTS

| Number | Name | Date |
| --- | --- | --- |
| 660,600 | Taplin | Oct. 30, 1900 |
| 1,258,515 | Wills | Mar. 5, 1918 |
| 1,792,577 | Eastman | Feb. 17, 1931 |
| 1,891,565 | May et al. | Dec. 20, 1932 |
| 1,912,988 | Masters | June 6, 1933 |